United States Patent
Lipton et al.

(10) Patent No.: US 9,993,104 B2
(45) Date of Patent: Jun. 12, 2018

(54) SYSTEM AND METHOD FOR CONTROLLING THE SALINITY OF WATER IN A CULINARY APPLICATION

(71) Applicant: Jeffrey Lipton, Medford, MA (US)

(72) Inventors: Jeffrey Lipton, Medford, MA (US); Stephen Thomas Asprinio, West Palm Beach, FL (US); Zachary Manchester, Cambridge, MA (US); David Moronitti, Austin, TX (US)

(73) Assignee: Jeffrey Lipton, Medford, MA (US)

( * ) Notice: Subject to any disclaimer, the term of this patent is extended or adjusted under 35 U.S.C. 154(b) by 139 days.

(21) Appl. No.: 15/272,566

(22) Filed: Sep. 22, 2016

(65) Prior Publication Data

US 2017/0079461 A1    Mar. 23, 2017

Related U.S. Application Data

(60) Provisional application No. 62/221,833, filed on Sep. 22, 2015.

(51) Int. Cl.
| | |
|---|---|
| *A47J 27/18* | (2006.01) |
| *C02F 1/68* | (2006.01) |
| *C02F 1/00* | (2006.01) |
| *A47J 27/00* | (2006.01) |
| *A47J 36/00* | (2006.01) |

(52) U.S. Cl.
CPC ............... *A47J 27/18* (2013.01); *C02F 1/001* (2013.01); *C02F 1/008* (2013.01); *C02F 1/686* (2013.01); *A47J 36/00* (2013.01); *A47J 2027/006* (2013.01); *C02F 2209/006* (2013.01); *C02F 2209/05* (2013.01); *C02F 2307/12* (2013.01)

(58) Field of Classification Search
CPC ...... A47J 27/18; A47J 2027/006; A47J 36/00; C02F 1/001; C02F 1/008; C02F 1/686; C02F 2209/05; C02F 2209/006; C02F 2307/12
USPC ................................................... 702/191–195
See application file for complete search history.

(56) References Cited

U.S. PATENT DOCUMENTS 7,993,600 B2 *   8/2011  Doyle .................... C01D 3/04
                                                          422/256

FOREIGN PATENT DOCUMENTS

| JP | 2002034791 A |   | 2/2002 |
| JP | 2006130086 A | * | 5/2006 |

* cited by examiner

*Primary Examiner* — Terry K Cecil
(74) *Attorney, Agent, or Firm* — Bond, Schoeneck & King, PLLC; William Greener; Jonathan Gray

(57) ABSTRACT

A system to control the salinity of an industrial pasta cooker. The system uses a model predictive estimator to estimate the state of the salt content, and predict an amount of salt to add to the system, in order to reach and maintain the target salinity. Salt may be added in short bursts, or gradually and continually to maintain the proper salt levels. Rather than use a human to taste, the system employs at least one sensor (conductivity, temperature and potentially a water level sensor) and a-priori knowledge of the system dynamics to estimate the system state using a state-estimating filter, such as a Kalman filter. This allows the system to reject noise from the sensor, and distinguish between NaCl and other compounds added to the water that effect the conductivity.

20 Claims, 4 Drawing Sheets

SYSTEM AND METHOD FOR CONTROLLING THE SALINITY OF WATER IN A CULINARY APPLICATION

CROSS-REFERENCE TO RELATED APPLICATIONS

This application claims priority to U.S. Provisional Patent Application Ser. No. 62/221,833, filed on Sep. 22, 2015 and entitled "System And Method For Controlling The Salinity Of Water In A Culinary Application," the entire disclosure of which is incorporated herein by reference.

FIELD OF THE INVENTION

The present disclosure relates to a system for measuring the salt content of a volume of water, and more particularly to controlling the salt content of an industrial pasta cooker.

BACKGROUND

To cook pasta correctly, it must be boiled in properly seasoned salt water. When the pasta is placed in boiling water, it absorbs a certain amount of salt. In a cooking environment (e.g., in a commercial pasta cooker), the level of the water and the amount of salt in the water is constantly changing. The effect is even greater in pasta cookers with an autofill feature that are constantly adding fresh water to the cooking vessel and draining undissolved salt through the bottom, or skimming the top layer of water. As a result, the water does not stay properly seasoned throughout the cooking cycle.

To check the saltiness, commercial pasta cookers require a user to taste the water each time a new batch of pasta is added to the cooking vessel. Because the water is boiling, this process can be painful for the user. The process is also subjective, as it requires user input. Different user preferences can result in differences between batches of pasta. And a variety of factors—such as kitchen's varying air quality, symptoms of allergies or a cold, or what other foods the user has recently eaten—can affect a user's ability to judge the water's salinity. This process is also inefficient as it demands a great deal of unnecessary attention from the chef throughout service, especially when the chef should be focusing on other critical aspects of pasta cookery that require a much higher level of expertise, as opposed to an elementary function such as seasoning boiling water.

Devices currently exist to measure the conductivity of the water, which can be used as a proxy for salt levels. However, these devices cannot distinguish between dissolved salt (NaCl), and any other ions or molecules in the solution, which can change conductivity. Additionally, this measurement only gives an approximation of the relative concentration of salts in the water, and cannot provide the user with the correct amount of salt to add to the water, in order to return the system to the target level of salinity. Lastly, this measurement cannot predict how long this particular amount of salt would last in the volume of water.

Accordingly, there is a continued need in the art for a system to accurately estimate the salt content of a volume of water and to predict how long this amount of salt will last in the volume of water over a period of time.

SUMMARY OF THE INVENTION

The present disclosure is directed to inventive methods and apparatus for estimating the salt content of a volume of water and predicting how long this amount of salt will last in the volume of water over a period of time. Various embodiments described in this disclosure control the salinity of the pasta water (or other water) by introducing known concentrations and volumes of salt into the water system.

In one embodiment, the system uses a model predictive estimator to estimate the state of the salt content, and predict an amount of salt to add to the system, in order to reach and maintain the target salinity. Salt may be added in short bursts, or gradually and continually to maintain the proper salt levels. Rather than use a human to taste, the system employs at least one sensor (conductivity, temperature and potentially a water level sensor) and a-priori knowledge of the system dynamics to estimate the system state using a state-estimating filter, such as a Kalman filter. This allows the system to reject noise from the sensor, and distinguish between NaCl and other compounds added to the water that effect the conductivity. Various means of correcting for an improper level of salt can be used such as prompting a user, automatic dosing of high saline solutions, or the production and dosing of high saline solutions.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
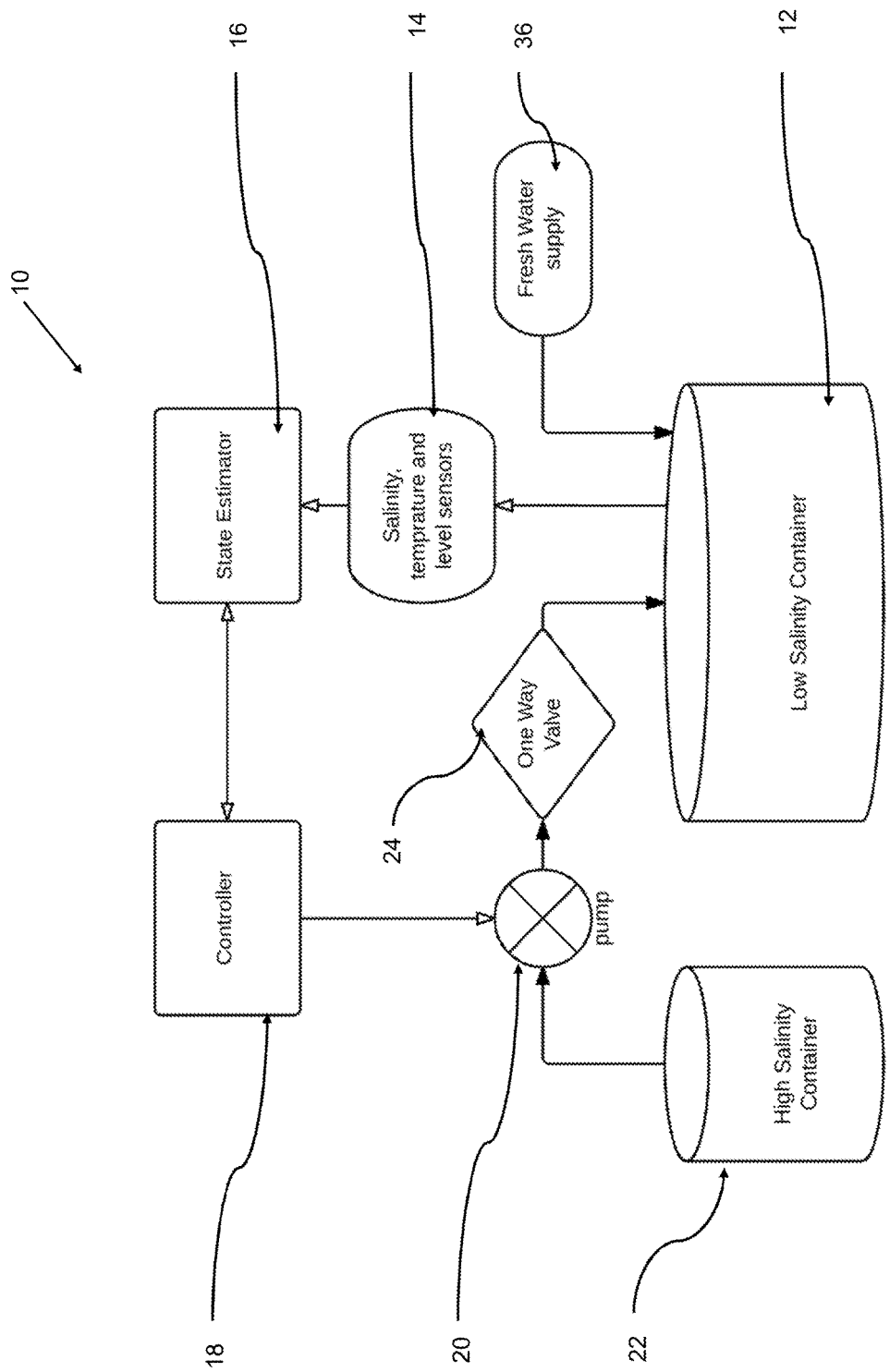
FIG. 1 is a block diagram of a system for controlling the salt content of a volume of water, according to an embodiment.

FIG. 1 shows an embodiment of a system 10 for controlling the salinity of water in a culinary application. As shown, system 10 may include a low-salinity container 12 (in other words, a container containing a low-salinity volume of water), one or more sensors 14, a state estimator 16, a controller 18, an actuator 20, and a high salinity container 22. In an embodiment, system 10 estimates the salt content of a low-salinity container 12 so that a user will know when to add salt, or salt may be automatically added. System 10 may be used to, for example, to control the salt content of the water in an industrial pasta cooker. Accordingly, system 10 may be part of an industrial pasta cooker or may be incorporated to an industrial pasta cooker as a separate part(s). One of ordinary skill in the art will, however, understand—in conjunction with a review of this disclosure—that the system may be used in any application where controlling or determining the salt content of a volume of water is required.

In an embodiment, state estimator 16 may be implemented with a computing device, such as a microcontroller, which includes a memory sufficient to store programming instructions and a processor sufficient to execute the stored programming instructions, to implement the state-estimator 16 as described in this disclosure. State estimator 16 may estimate the current salt content of low-salinity container 12. To estimate the current salt content of the low salinity container, the state estimator 16 may use a system dynamics model and inputs from sensors 14. For example, state estimator 16, in an embodiment, may be a Kalman filter. In the Kalman filter embodiment, state estimator 16 may predict (e.g., using previous state information and a system dynamics model) an amount of salt in low-salinity container 12, and combine that predicted amount with a measured amount of salt in the low-salinity container 12, arriving at an estimated current salt content of low-salinity container 12. One of ordinary skill will appreciate—in conjunction with a review of this disclosure—that the state-estimator may be any state estimator, as are known, that can estimate the salt content of low-salinity container 12. In alternate embodiments, state estimator 16 may be implemented as continuous time or discrete time.

In discrete time, time steps are separated by a unit of time $\Delta t$. This means time step k+1 is $\Delta t$ seconds ahead of time step k. Using this notation, the system dynamics model, in one embodiment, for a low salinity container may be given by $$S_{k+1} = S_k e^{-\frac{\Delta t}{\tau}}$$

where $\Delta t$ is the time interval between time step k and time step k+1 and, $S_k$ is the salt concentration at time k, and $\tau$ is a time constant. In the example of an auto-filling pasta cooker with a twelve gallon capacity, may be given as 3,595 seconds. Further, in an embodiment, $\Delta t$ is one second. This model was derived by measuring a pasta cooker during heavy use.

The system dynamics model, in an embodiment, is embedded in the Kalman filter (or other state estimator) used to estimate the state of the low salinity container. In the case of an auto-filling pasta cooker, the low salinity container is a kettle of boiling water with baskets of pasta in it. The Kalman filter uses the system dynamics model and sensor data from time step k or from initialization to time step k to predict the state at time step k+1. In one embodiment, the input to the dynamics model is the most recent estimated state (i.e., the most recent output of the Kalman filter) which incorporates all sensors 14 data until that point. The predicted state is then combined with the sensors 14 input (i.e. the measured salt content of low-salinity container 12) using a weighted average. The output of the weighted average is an estimated salt content of low-salinity container 12. In an embodiment, a second Kalman filter—or other state estimator—may be implemented to estimate the values in the model such as $\tau$, based upon the measurements history.

Sensors 14 may include one or more sensors sufficient for measuring the salt content of the volume of water in low-salinity container 12. For example sensors 14 may be a conductivity sensor. The conductivity of the water may be considered a proxy for salt levels. In alternate embodiments, additional sensors such as water level sensors, humidity sensors, pressure and water flow rate sensors can be integrated into the system and used in state estimator 16 to produce a more accurate estimate of the state of the low salinity container.

Sensor data such as the conductivity measurements, temperature measurements, and others can be preprocessed by a calibration algorithm to adjust the values before being using them in the system dynamics model, state estimator 16 or controller 18. The calibration algorithm can reference one or more prerecorded calibration points and models of the sensor performance to make the correction to the sensor readings. The calibration algorithm can use multiple measurements of known references and could fit a single linear calibration to the sensor readings, or it could use a higher order polynomial whose order is at least one less than the number of calibration reference points. It could also use linear interpolation or quadratic interpolation between the reference points to generate a calibration curve. The calibration algorithm could be multi-dimensional, allowing for the conductivity readings to be calibrated relative to known concentrations at different temperatures. This would create a series of one dimensional curves in a two dimensional space. Interpolating between these curves would define a two dimensional surface on which true readings would lie. For a measured temperature and conductivity, the surface would define a true conductivity reading.

Returning to the output of the state estimator 16, the estimated state may be provided to a user, such that the user could then manually determine whether to add salt to low-salinity container 12. For example, system 10 can recommend the amount of salt needed to be added by a user to reach the desired salinity for a period of time by integrating the concentration model information with a stored or derived estimate of the water level. This information can be shared with an indicator such as a text message, or a display on the device (e.g., a screen or an LED). In embodiment, the current estimated salt content may be communicated to a user. In an alternate embodiment, only a notification to add salt, or to add a certain amount of salt may be communicated to a user.

Whether the salt content is low may be determined by relative magnitude of the noise for the model and the noise of the sensor. While in need of salt, the relative magnitude of the noise for the model and the noise for the sensor should be set to one to allow the system to track the state changes through the addition of salt. Once the salt is added by the user, the model noise should be an order of magnitude smaller than the sensor noise. This is detected when the salinity levels rises sharply and then starts to fall. Also, once the salt is added to low-salinity container 12, system 10 can communicate its state to the user using the same, or different, indicator (e.g., LED, screen, etc.).

In alternate embodiments, system 10 may automatically add salt to low-salinity container 12 when the salt content is low. For example, as described above, system 10 may include a controller 18 and an actuator 20—the actuator being configured to add salt to low-salinity container 12 upon a command from controller 18. In an embodiment, controller 18 may be a microcontroller or pump controller (or both), sufficient for activating actuator 20. In embodiment, controller 18 may be implemented by the same computing device that implements the state estimator 16. Actuator 20 may be a pump, or any other mechanism for introducing a portion of the high-saline volume of a water (stored in the high-salinity container 22) to low-salinity container 12. For example, if high-salinity container 22 is mounted above low-salinity container 12, actuator 20 may be a valve that opens to allow the high saline water to be gravity fed to low-salinity container 12. Of course, low-salinity container 12 and high-salinity container 22 may be connected by pipes or tubes as is necessary to communicate the high-saline water to low-salinity container 12.

High-salinity container 22 can be a disposable bag system or a reusable container that contains a known concentration of saline. In an embodiment, high-salinity container contains saturated saline which is about 35 g of salt per 100 g of water. This is generally an order of magnitude higher than the target salinity of the low-salinity container 12. In an embodiment, the low-salinity container 12 may have a salinity set point between 0.1 and 4% salt by weight.

System 10 may further include a fresh water supply. In this disclosure, fresh water may be understood to be water with a low or minimal salt content, such that the fresh water, when added low-salinity container 12 is sufficient to bring down the salt content (by percentage) of the volume of water in low-salinity container 12. Fresh water supply 36 may be used to control the water level of low-salinity container 12 or to bring down the salt content of low-salinity container 12.

In an embodiment controller 18 may convert information about the state of low-salinity container 12 and the desired salt content (set point) into commands for actuator 20 (or other actuator 20, system 10 may include in alternate embodiments). In one embodiment, a permissible window is created around the set point. When the salt concentration falls below the lower bound of the window, actuator 20 would be activated to introduce high-salinity water to low-salinity container 12. When the salt concentrations go above the upper bound, actuator 20 would be deactivated. The upper bounds and lower bounds could be set at values relative to the set point. For example, upper bound can be set to from the set point to 10% above while the lower bound can be from just below the set point to minus 10%. Advantageously, the upper bound is set at the set point and the lower bound is 2% below the set point. This allows salt content to never go above the point and never fall too far below the set point. The window may be implemented with a Bang-Bang controller, which switches the actuator 20 to be either on at full force or off, rather than operate continuously at a low pump rate. This ensures a more accurate dosing of salt from high-salinity container to the low-salinity container 12.

An alternative controller would be a PID controller which has tunable gains for the proportional, integral and derivative terms of the error. The error is the difference between the current state of the system and the desired state of the system. The sum of the three terms gives a command signal. This is less desirable than a Bang-Bang controller since it would require the motors in the pumps to operate continuously at low speeds, which is far less efficient and consistent than running them at full on and full off. This is especially true in the case of a peristaltic pump which has high static friction and can have a dead-band at low speeds.

In alternate embodiments, additional sensors such as water level sensors 14, humidity sensors, pressure and water flow rate sensors can be integrated into the system and used in the Kalman filter to produce a more accurate estimate of the state of the low-salinity container 12 or the high-salinity container 22.

When the high-salinity volume of water is being added low-salinity container 12, a different state dynamics model must be used to account to for the rising—rather than falling—saline content of the volume of water stored in low-salinity container 12. For example, the following state dynamics model may be used:

$$S_{k+1} = S_k e^{-\frac{\Delta t}{\tau}} + Bu,$$

where B is the effect the pump has on concentration and U is the control signal to the pump. In an example of an auto filling pasta cooker with a twelve gallon capacity as the low-salinity container 12, Bu may be 0.1. This model was derived by measuring a pasta cooker while in heavy use. The system dynamics may be embedded in a Kalman filter used to estimate the state of the low salinity container. In the case of an auto-filling pasta cooker, the low salinity container is a kettle of boiling water with baskets of pasta in it. The relative magnitude of the model and sensor noise should remain constant through operation. The model noise should be at least half the magnitude of the sensor noise in the Kalman filter. A second Kalman filter (or other state estimator) can be implemented to estimate the values in the model such as tau, or B based upon the measurements history.

In an embodiment, actuator 20 (which may be a pump) connects the high-salinity container 22 to the low-salinity container 12. There may be a one way valve 24 attached at or near the end of the tubes to prevent osmosis from pulling salt from the tubing into the low salinity container. Actuator 20, in one embodiment, is a peristaltic pump. In the twelve gallon auto-filling pasta cooker example, the total pumping system generally should have a flow rate of 116 ml/min or higher for use in conjunction with. Alternately, two pumps, each with a flow rate of 55 ml/min or greater is advantageous since it will provide redundancy for the system. Should a single pump fail the system could continue to operate. Further, more than one end of the tube can be used to connect the one or more pumps to the low salinity container. This allows them to be placed in multiple locations in the container and allow the salt to distribute evenly more quickly than a single point of injection would allow.

Figure 2:
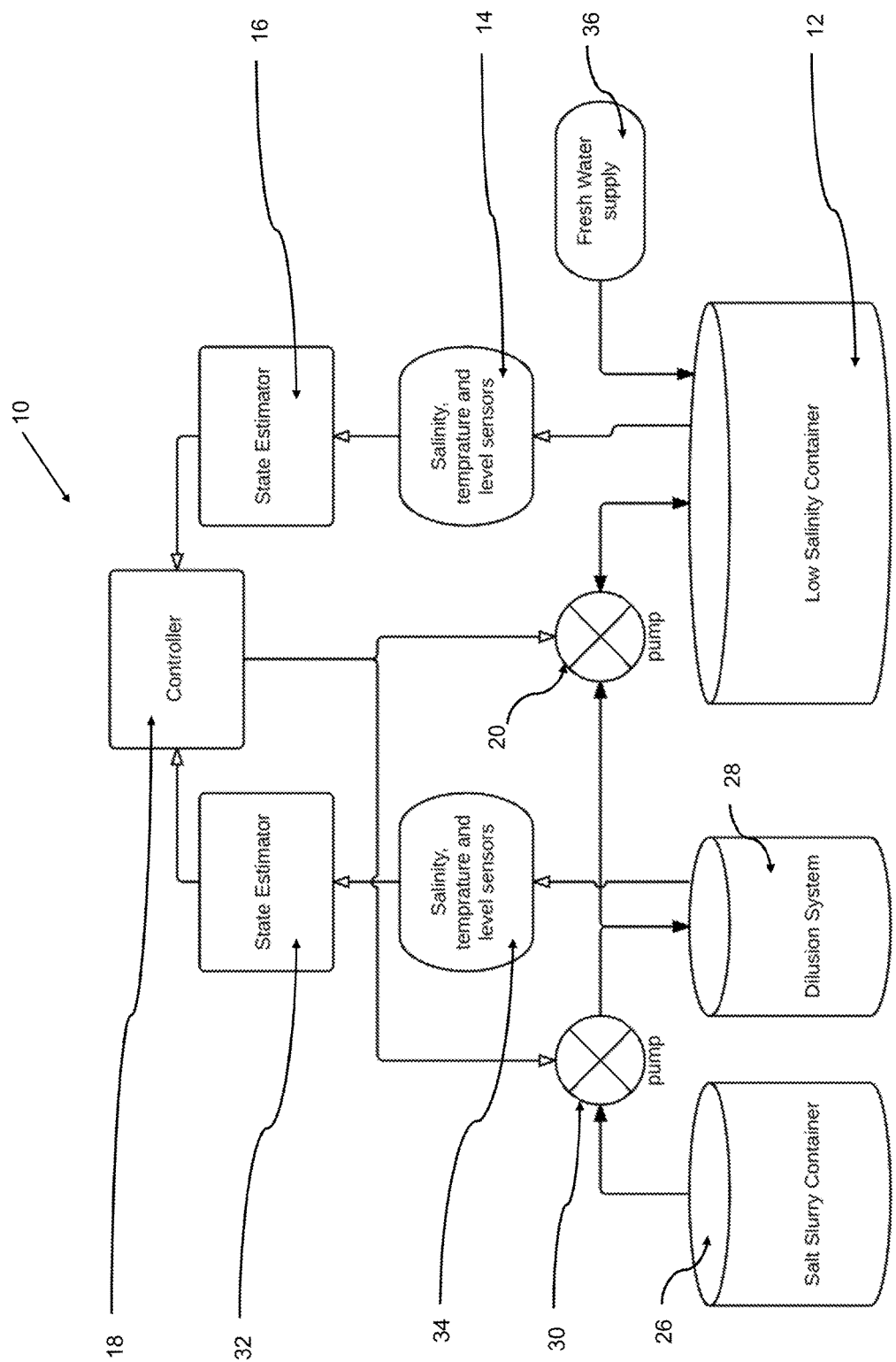
FIG. 2 is a block diagram of a system for controlling the salt content of a volume of water, according to an embodiment.

FIG. 2 depicts an alternative to high-salinity container 22. In the embodiment shown, a sub-system 10, comprising salt slurry container 26 and dilution system 28 produces high salinity solutions. Salt can be added to the container. Water can be added automatically or manually. Heat and agitation is applied to the salt and water to produce a high salinity solution in the container. The system will then act as the high-salinity container 22 described above.

In the embodiment of FIG. 2, salt from salt slurry container 26 may be automatically dosed using one or more actuators 30 (e.g., pumps). If the salt is sufficiently dry, it can be treated as a granular solid. In such a case the actuator 30 may be an auger screw or similar system. As seen in FIG. 2, a diffusion system 28 and salt slurry container 28 along with one or more actuator 20, sensors 34 and controller 18 are used to replace the high-salinity container 22. This sub-system can be configured to either continuously produce a solution of known salinity, or can produce discrete volumes of solution. In the case of discrete production, salt slurry is pumped into container within dilution system 28. The container is of a known volume, so the amount of salt that will convert that volume of low salinity water into the desired high salinity water may be calculated. The actuator 30 from the salt slurry will dispense that amount of salt into the dilution system 28. Actuator 20 will then pump (or otherwise move) water from low-salinity container into dilution system 10. (In an alternate embodiment, fresh water may be pumped into dilution system 10, instead of water from low-salinity container 12.) The contents of the container are then mixed to produce the targeted volume of high salinity water. The mixing container can then be used as the high salinity container 22 previously described. This production of high salinity solution from salt slurry and low salinity water can occur once per daily usage when the low-salinity container 12 is filled with fresh water, or can be done multiple times a day or as needed.

As shown in FIG. 2, in an embodiment, the dilution process can be monitored by additional sensors 34 (in varying embodiments including salinity, temperature, and water level sensors) whose data can be fed into another state estimator 32 for that subsystem. This state estimate can then be used to control actuator 30 for the salt slurry container 26 and actuator 20 for low-salinity container 12. The state of the high salinity solution chamber may be used to determine the amount of solution which will be pumped into the low salinity container to reach the target salinity and to determine how pump activation will affect the state of the low-salinity container 12.

Figure 3:
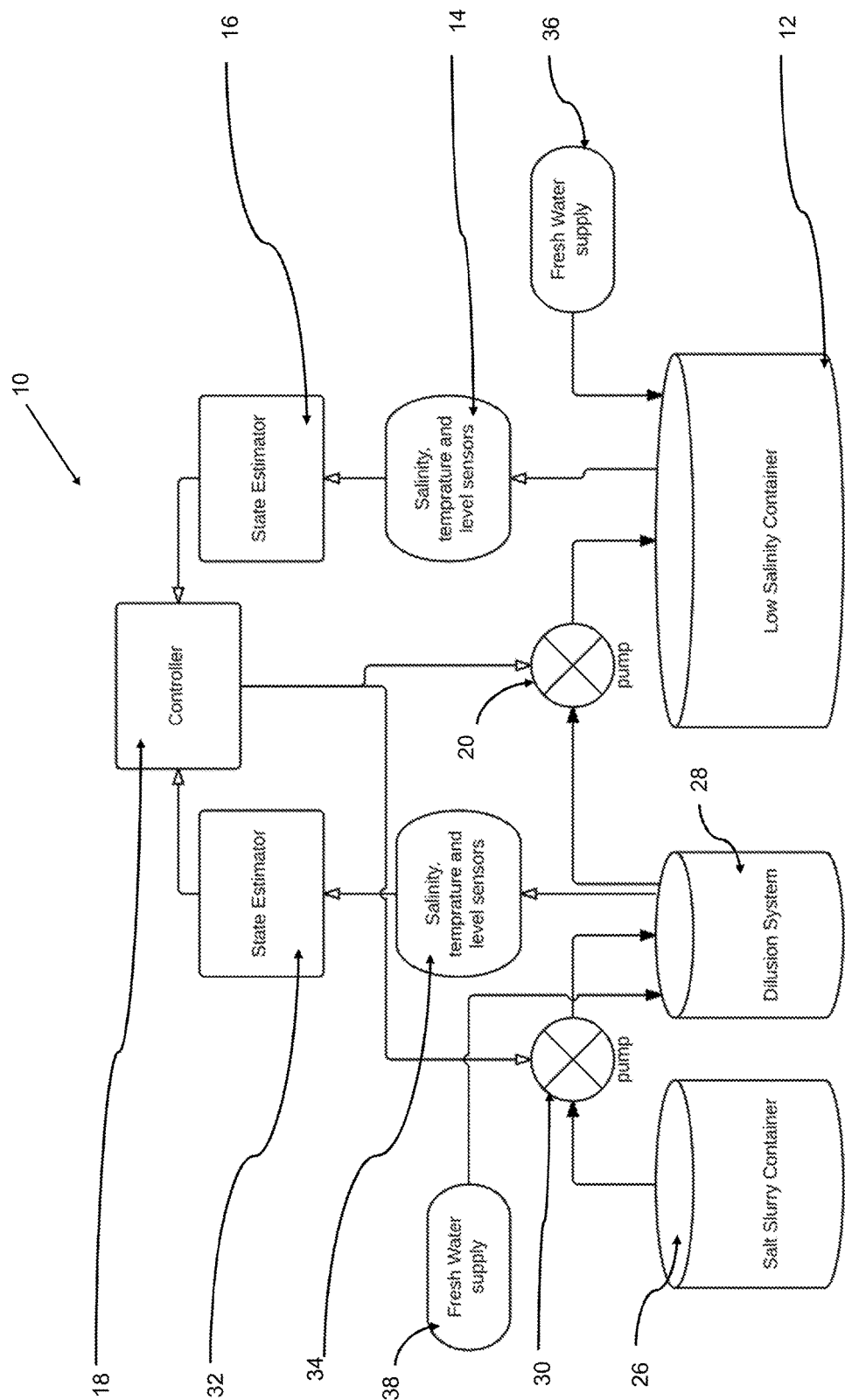
FIG. 3 is a block diagram of a system for controlling the salt content of a volume of water, according to an embodiment.

A further modification of the dilution system, seen in FIG. 3, can allow the dilution system 10 to have an independent source of fresh water 38 from the low-salinity container 12. This allows the system to have a single direction of flow of material. Water and slurry flow into the dilution system and then are pumped into the low salinity container. This prevents contamination from cooking from flowing into the dilution system and reduces the need to clean the system on a regular basis.

An alternative to the separate salt slurry container and dilution system is to unify them into a single subsystem. A container of slurry can have water from the low-salinity container 12 or a separate fresh water source 38 pumped through it. Pumping the water through a volume of salt slurry will cause the water to become saturated with salt. This water can then be pumped into the low salinity container. This effectively is the same as filling the high salinity container with more salt than can be absorbed by the water, draining it, and adding water from the low salinity container to replenish the water levels and using the salt slurry to provide the needed salt to the low salinity water to turn it into high salinity water. To prevent the less dense low salinity water from passing through the salt slurry too quickly to saturate, baffles or meshes can be added to the salt slurry container to force the water to pass through the slurry. Additionally, the container of slurry can be expandable and water from the low-salinity container 12 or a fresh water source 38 can be pumped into the salt slurry container 26. The salt would dissolve until it reached saturation, causing the salt slurry container 26 to become the high-salinity container 22.

Figure 4:
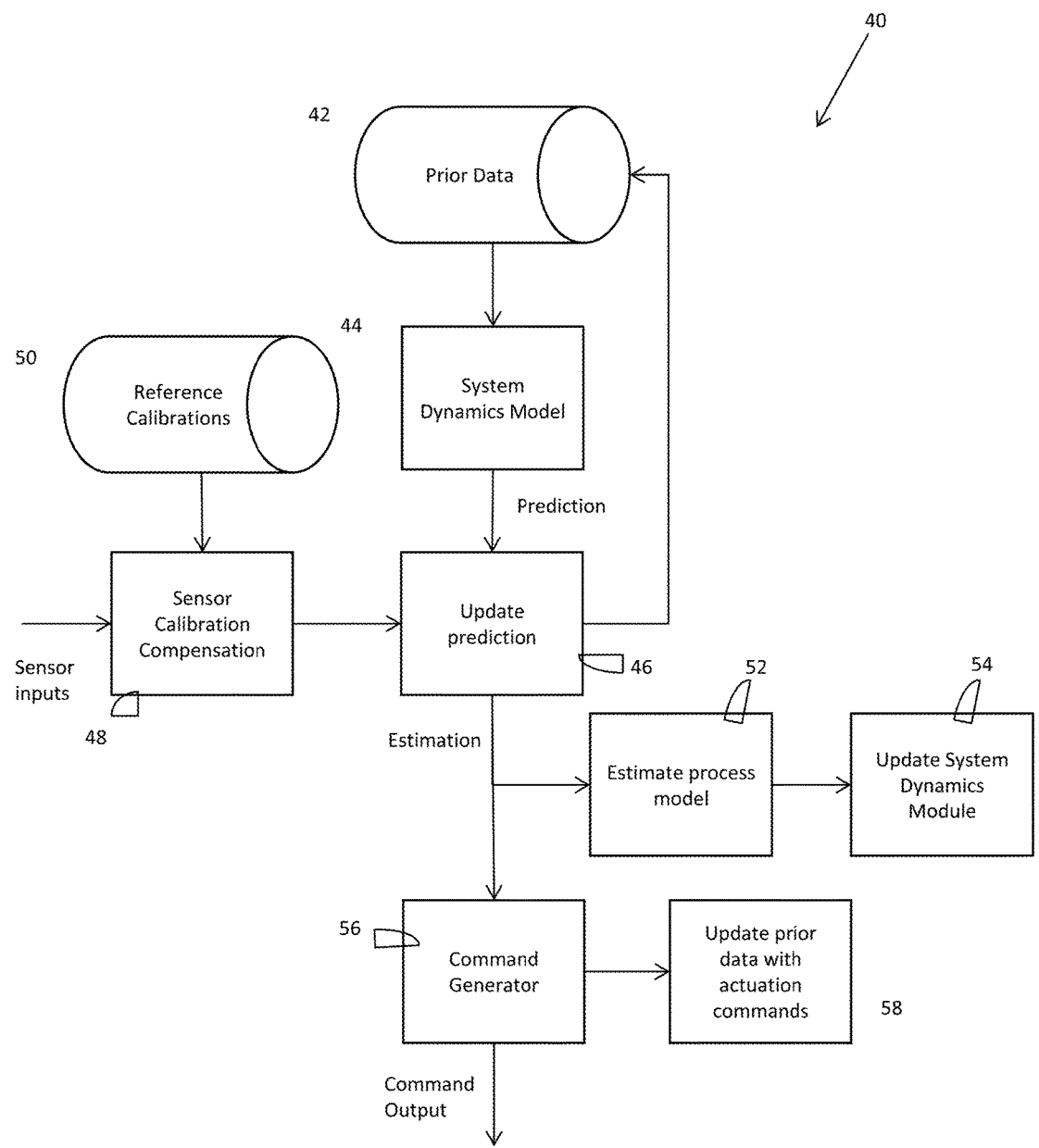
FIG. 4 is a block diagram of a control system, according to an embodiment.

Turning now to FIG. 4, there is a block diagram of a control system 40 according to an embodiment. As described previously, control system 40 is comprised of state estimator 16, controller 18, and the calibration compensation described in conjunction with the input sensor data, which, in turn, are implemented by one or more computing devices, such as microcontrollers.

As shown, state estimator 16 is comprised, in an embodiment, of a memory storing prior data (e.g., previous states, or the most recent state, of the state estimator), the system dynamics model, and the update prediction module 46. System dynamics model 44 uses the stored state information 42 as an input to the system dynamics model (such as previously described) to predict the state of the salt content of the low-salinity container 12. Update prediction module 46 compares this prediction (i.e., the expected state) to the input sensor data, and updates the prediction using the input sensor data to form a estimation of the present state of the salt content of low-salinity container 12. The update may take the form of a weighted average, as previously described, but may take other forms as are understood in other implementations of Kalman filters and known state estimators.

The sensor data as fed to the update prediction module 46 may first come through, in an embodiment, sensor calibration compensation module 48. Sensor calibration compensation module 48 may use reference calibrations 50 to calibrate or otherwise adjust the input sensor data. As previously described, sensor calibration compensation module 48 can reference one or more prerecorded calibration points and models of the sensor performance to make the correction to the sensor readings. The calibration compensation module 48 can use multiple measurements of known references and could fit a single linear calibration to the sensor readings, or it could use a higher order polynomial whose order is at least one less than the number of calibration reference points. It could also use linear interpolation or quadratic interpolation between the reference points to generate a calibration curve. The calibration compensation module 48 can be multi-dimensional, allowing for the conductivity readings to be calibrated relative to known concentrations at different temperatures. This would create a series of one dimensional curves in a two dimensional space. Interpolating between these curves would define a two dimensional surface on which true readings would lie. For a measured temperature and conductivity, the surface would define a true conductivity reading.

The output of update prediction module 46 may be fed to estimate process model module 52. Estimate process model module may be part of a second state estimator (e.g. a second Kalman filter) and may use the difference between the state estimate, the prediction, and the sensor data to update the system dynamics model used in system dynamics model module 44. This will permit the system 10 to become more accurate with use.

The output estimate of update prediction module 46 may also be fed to command generator 56 to generate command for actuators 20, 30. As described above, this may be accomplished by setting a window including one or more thresholds. When the salt content exceeds or falls below the thresholds, actuators 20, 30 are activated to raise or lower the salt content of low-salinity container 12, as will be understood in conjunction with a review of this disclosure. The commands may be stored as part of the state of the system 10.

The invention claimed is:

1. A device for controlling a salt content of a volume of water, comprising:
   one or more sensors configured to be placed in the volume of water having the salt content and to perform a plurality of measurements, each measurement measuring a characteristic of the volume of water for at least one point in time;
   a state-estimating filter configured to receive at least one of the plurality of measurements, and to estimate, using a system dynamics model and the received at least one measurement, an estimated salt content of the volume of water;
   a controller configured to activate an actuator to add salt to the volume of water when the estimated salt content is lower than predetermined threshold.

2. The device of claim 1, wherein the state-estimating filter is a Kalman filter.

3. The device of claim 1, wherein the system dynamics model comprises:

$$S_{k+1} = S_k e^{-\frac{\Delta t}{\tau}}$$

wherein $S_{k+1}$ is a next state, $S_k$ is a current state, $\Delta t$ is a time difference between the next state and the current state, a $\tau$ is a time constant.

4. The device of claim 1, wherein the system dynamics model, when salt is being added to the volume of water, comprises:

$$S_{k+1} = S_k e^{-\frac{\Delta t}{\tau}} + Bu$$

wherein $S_{k+1}$ is a next state, Sk is a current state, $\Delta t$ is a time difference between the next state and the current state, a $\tau$ is a time constant, B is an effect the controller has on the concentration and u is the controller signal.

5. The device of claim 1, further comprising a second state-estimating filter configured to estimate at least one value of the system dynamics model.

6. The device of claim 1, wherein the controller is a PID controller.

7. The device of claim 1, wherein the controller is configured to activate the actuator when the estimated salt content falls below a predetermined threshold, and to cease activating the actuator when the salt exceeds the predetermined threshold.

8. The device of claim 1, wherein the actuator is configured to add salt to the volume of water by adding a portion of a volume of high-salinity water to the volume of water.

9. The device of claim 8, wherein the controller is configured to mix a salt slurry and water to create the volume of high-salinity water.

10. The device of claim 9, wherein the high—salinity water is made by pumping low salinity water into a disposable bag of salt slurry.

11. A device for notifying a user of a salt content of a volume of water, comprising:
one or more sensors configured to be placed in the volume of water having the salt content and to perform a plurality of measurements, each measurement measuring a characteristic of the volume of water for at least one point in time;
a state-estimating filter configured to receive at least one of the plurality of measurements, and to estimate, using a system dynamics model and the received at least one measurement, an estimated salt content of the volume of water;
an indicator configured to notify the user of the estimated salt content of the water.

12. The device of claim 11 wherein the indicator notifies the user when the salt content falls below a predetermined threshold.

13. The device of claim 11 wherein the indicator notifies the user of the amount of salt to add to reach the predetermined threshold.

14. A method for controlling a salt content of a volume of water, comprising:
measuring, using one or more sensors configured to be placed in the volume of water having the salt content, a characteristic of the volume of water for at least one point in time;
estimating, using a state-estimating filter including a system dynamics model and the received measurement, an estimated salt content of the volume of water;
activing, using a controller, an actuator to add salt to the volume of water when the estimated salt content is lower than predetermined threshold.

15. The method of claim 14, wherein the state-estimating filter is a Kalman filter.

16. The method of claim 14, wherein the system dynamics model comprises:

$$S_{k+1} = S_k e^{-\frac{\Delta t}{\tau}}$$

wherein $S_{k+1}$ is a next state, Sk is a current state, $\Delta t$ is a time difference between the next state and the current state, a $\tau$ is a time constant.

17. The method of claim 14, wherein the system dynamics model, when salt is being added to the volume of water, comprises:

$$S_{k+1} = S_k e^{-\frac{\Delta t}{\tau}} + Bu$$

wherein $S_{k+1}$ is a next state, $S_k$ is a current state, $\Delta t$ is a time difference between the next state and the current state, a $\tau$ is a time constant, B is an effect the controller has on the concentration and u is the control signal to the pump.

18. The method of claim 14, further comprising the step of estimating, using a second state-estimating filter, at least one value of the system dynamics model.

19. The method of claim 14, wherein the step of adding salt to the volume of water comprises adding a portion of a volume of high-salinity water to the volume of water.

20. The method of claim 19, further comprising the step of mixing a salt slurry with water to form the volume of high-salinity water.

* * * * *